United States Patent [19]
Messick

[11] Patent Number: 5,661,370
[45] Date of Patent: Aug. 26, 1997

[54] MULTI-POSITIONABLE MOTION ACTIVATED LIGHT SWITCH

[76] Inventor: Marlin J. Messick, 1553 Forest Ave., Saraland, Ala. 36571

[21] Appl. No.: 596,437

[22] Filed: Feb. 2, 1996

[51] Int. Cl.⁶ .................................................. H05B 37/00
[52] U.S. Cl. .......................... 315/158; 315/159; 340/541; 250/342
[58] Field of Search ..................... 315/158, 159, 315/56, 71, 72; 250/227.11, 239, 214 AL, 227.14, 342, DIG. 1; 340/541, 554, 555

[56] References Cited

U.S. PATENT DOCUMENTS

| | | | |
|---|---|---|---|
| 3,621,269 | 11/1971 | Misencik | 250/227 |
| 4,023,035 | 5/1977 | Rodriquez | 250/239 |
| 4,988,921 | 1/1991 | Ratner et al. | 315/159 |
| 4,992,701 | 2/1991 | Sacchetti | 315/159 |
| 5,136,213 | 8/1992 | Sacchetti | 315/159 |

*Primary Examiner*—Robert Pascal
*Assistant Examiner*—David Vu
*Attorney, Agent, or Firm*—Joseph N. Breaux

[57] ABSTRACT

A multi-positionable motion activated light switch including a male/female adaptor assembly having a male plug portion that is mechanically and electrically mateable with an existing light bulb socket, a female socket portion that is mechanically and electrically mateable with the connecting base of an existing light bulb; a motion sensor circuit including a motion sensing mechanism housed within a sensor housing having a sensing aperture through which the motion sensing mechanism is exposed to physical phenomenon; and a flexible support structure, connectable between the adaptor assembly and the sensor housing that includes electrical conductors and a resilient core member having at least two bendable stiffening members encased therein. The flexible support structure allows the sensing aperture of the sensor housing to be directed in a variety of user selected directions.

20 Claims, 2 Drawing Sheets

MULTI-POSITIONABLE MOTION ACTIVATED LIGHT SWITCH

TECHNICAL FIELD

The present invention relates to motion activated light switches and more particularly to a motion activated light switch that includes a motion sensing mechanism mounted to a flexible support that is bendable into a variety of configurations allowing the motion sensing mechanism to be aimed in a desired direction.

BACKGROUND ART

It is often desirable to provide motion activated lighting to areas such as the entryways and perimeters of buildings. These lights enhance the safety of these area by illuminating hazards and provide increased security from intruders. It is, however, often economically beyond the means of many individuals to have such dedicated motion activated light switches installed. It would be a benefit, therefore, to have a motion activated light switch that could be installed into an existing light bulb socket. It would be a further benefit if the motion sensing mechanism within the motion activated light switch could be easily aimed in a desired direction. Because an existing light bulb socket may be located in a location blocked by existing building structures or shrubbery, it would be further desirable if the motion sensing mechanism could be located in a variety of locations adjacent the light bulb socket without the necessity of rewiring or moving the light bulb socket.

GENERAL SUMMARY DISCUSSION OF INVENTION

It is thus an object of the invention to provide a multi-positionable motion activated light switch that is installed into an existing light bulb socket.

It is a further object of the invention to provide a multi-positionable motion activated light switch that has a motion sensing mechanism within the light switch that is easily aimed in a desired direction.

It is a still further object of the invention to provide a multi-positionable motion activated light switch that includes a positioning structure supporting a motion sensing mechanism that is of a length sufficient to allow the motion sensing mechanism to be positioned in a variety of locations adjacent the light bulb socket.

It is a still further object of the invention to provide a multi-positionable motion activated light switch that accomplishes all or some of the above objects in combination.

Accordingly, a multi-positionable motion activated light switch is provided. The light switch comprises a male/female adaptor assembly including: a male plug portion having a first and second electrical contact, the plug portion being mechanically mateable with an existing light bulb socket having third and fourth electrical contacts in a manner such that the first and second electrical contacts are each brought into and maintained in electrical connection with one of the third and fourth electrical contacts when the plug portion and existing light bulb socket are mated; and a female socket portion having a fifth and sixth electrical contact, the socket portion being mechanically mateable with the connecting base of an existing light bulb having seventh and eighth electrical contacts in a manner such that the fifth and sixth electrical contacts are each brought into and maintained in electrical connection with the seventh and eighth electrical contacts when the female socket portion and conventional base of an existing light bulb are mated; a motion sensor circuit including a motion sensing mechanism, the motion sensing circuit having a control output in controlling connection with a control input of a power switching device having a first power input terminal and a first power output terminal, the motion sensing circuit being housed within a sensor housing having a sensing aperture through which the motion sensing mechanism is exposed to physical phenomenon; and a flexible support structure, connectable between the adaptor assembly and the sensor housing, having a first and a second electrical conductor running along an entire length thereof through at least one conductor passageway formed through a resilient core member thereof, the core member having at least two bendable stiffening members encased therein along a length thereof, the two stiffening members requiring a force greater than a force equal to a weight of the sensor housing to cause the two stiffening members to bend; the first conductor being in electrical connection between one of the first and second contacts and the first power input terminal of the power switching device, the second conductor being in electrical connection between one of the fifth and sixth contacts and the first power output terminal of the power switching device, the remaining first and second contact being in electrically conducting connection with the remaining fifth and sixth contact when an electrical conducting pathway is provided between the power input terminal and the power output terminal of the power switching device.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
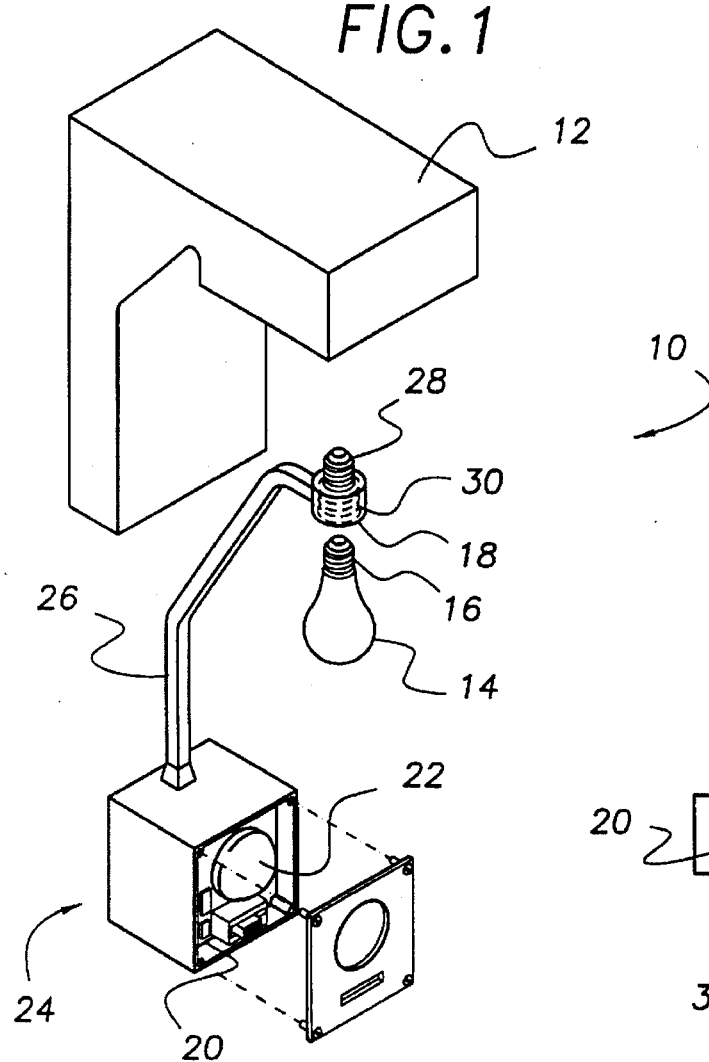
FIG. 1 is a partially exploded perspective view of an exemplary embodiment of the motion activated light switch of the present invention including an exemplary male/female adaptor assembly, flexible support structure and motion sensor circuit along with a representative light fixture and light bulb.

FIG. 1 is a partially exploded perspective view of an exemplary embodiment of the multi-positionable motion activated light switch of the present invention, generally designated by the numeral 10, in combination with a representative light fixture 12 and a representative light bulb 14. Light fixture 12 is of the type having a conventional screw type light bulb socket connectable with a screw-in base 16 of representative light bulb 14.

Figure 1A:
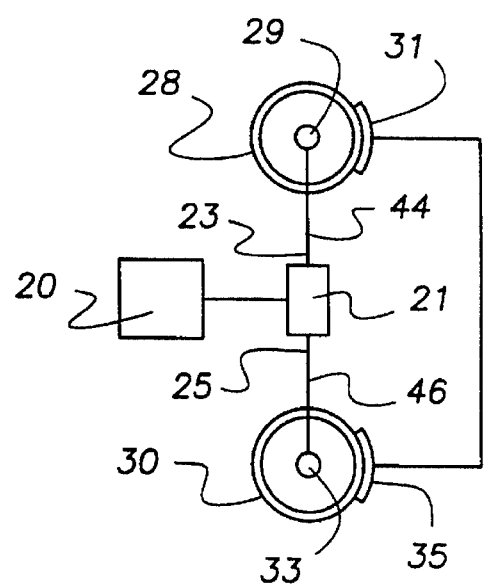
FIG. 1A is a schematic view of the wiring connections between the power switching device, and the electrical contacts of the male/female adaptor assembly.

Light switch 10 includes a male/female adaptor assembly 18, a motion sensor circuit 20 including a motion sensing mechanism 22 housed within a sensor housing 24; and a flexible support structure 26. Male/female adaptor assembly 18 includes a male plug portion 28 having a first and a second electrical contact 29, 31 (shown schematically in FIG. 1A). Plug portion 28 has a screw type connector mechanically and electrically compatible with a conventional screw type light bulb socket. The mechanical connection between plug portion 28 and the conventional light bulb socket provides the physical support for light switch 10. The electrical connection between first and second contact 29, 31 of plug portion 28 and the electrical contacts of the conventional light bulb socket supplies the electrical power to power motion sensing circuit 20 and any conventional light bulb installed within a female socket portion 30.

In this embodiment, female socket portion 30 is a conventional screw type, light bulb socket of the type mechanically and electrically mateably connectable with male plug portion 28. Female socket portion 30 includes a fifth and sixth electrical contact 33, 35 (shown schematically in FIG. 1A) that electrically contact the electrical contacts of conventional representative light bulb 14. In this embodiment the first and fifth electrical contacts 29, 33 are designated the hot contacts and the second and sixth electrical contacts 31, 35 designated the return contacts. The second and sixth electrical contacts 31, 35 are wired together.

Motion sensor circuit 20 is a conventional infrared motion sensing circuit having a conventional infrared motion sensing mechanism 22 for detecting motions in a desired sensing area. Motion sensing circuit 20 is housed within sensor housing 24. With reference to operational schematic FIG. 1A, a normally closed, two contact power relay 21 having a power input terminal 23 and a power output terminal 25 is controlled by motion sensor circuit 20. When motion sensor circuit 20 is ON, normally closed, two contact relay 21 is maintained in the open state until a motion is sensed. When a motion is sensed, motion sensing circuit 20 allows normally closed, two contact power relay 21 to close. When motion sensor circuit 20 is OFF, normally closed, two contact power relay 21 is closed.

Figure 2:
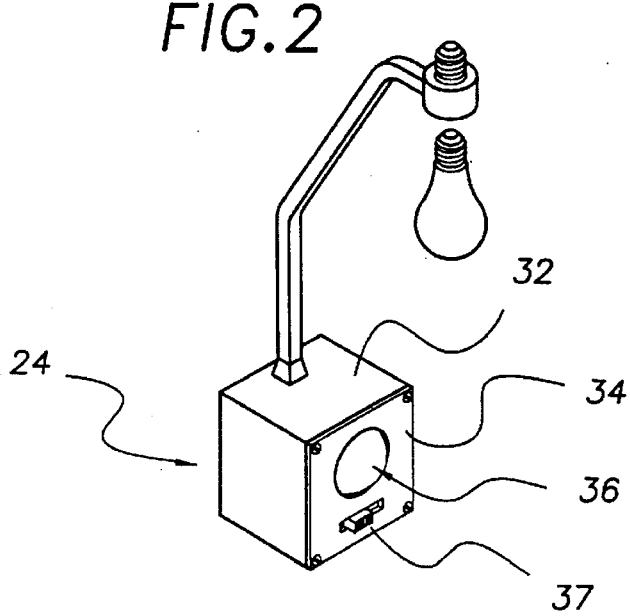
FIG. 2 is a perspective view of the light switch of FIG. 1 with the representative light bulb installed within the female socket portion of the male/female adaptor assembly.

With reference to FIG. 2, sensor housing 24 includes a substantially rectangular square plastic housing box 32 and an attachable front cover 34. Front cover 34 has a sensing aperture 36 through which motion sensing mechanism 22 (FIG. 1) receives infrared energy from the sensing area. An ON/OFF control switch 37 is provided and connected to motion sensing circuit 20 to turn motion sensing circuit 20 ON and OFF.

Figure 3:
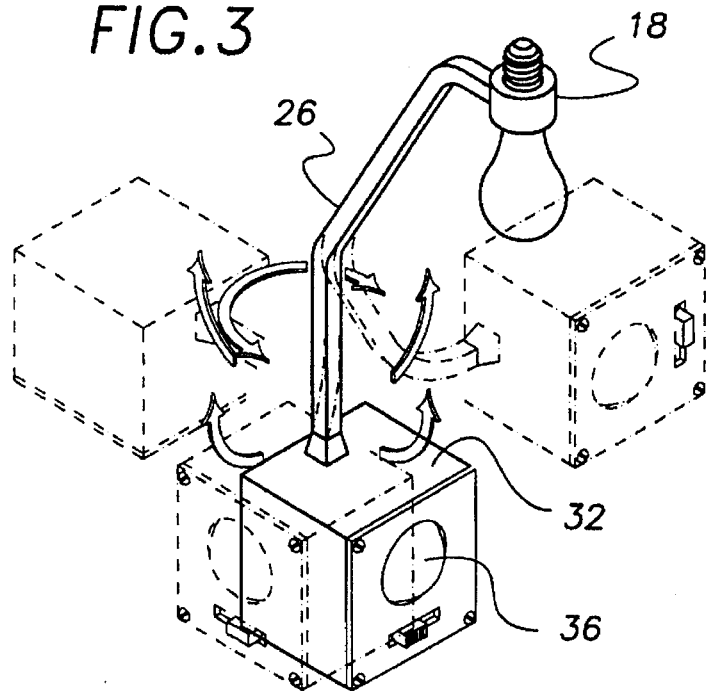
FIG. 3 is a perspective view of the light switch of FIG. 1 with the first end of the flexible support structure directed in a second exemplary user selected direction with respect to the second end of the flexible support structure.
Figure 4:
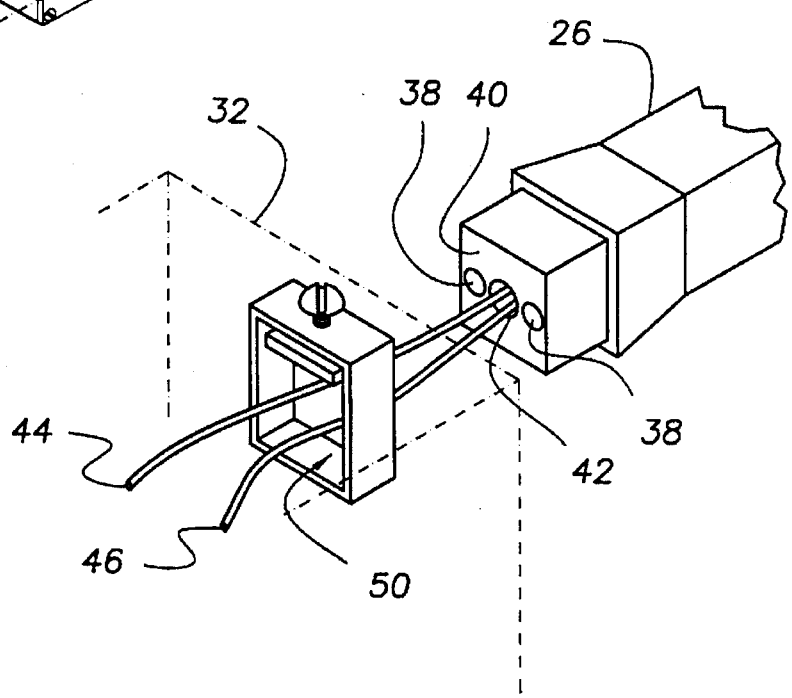
FIG. 4 is a exploded perspective view of the connection between an end of the flexible support structure and the sensor housing, the resilient core member having the first and second conductors running through the conductor passageway, and the ends of the two bendable stiffening members.
Figure 5:
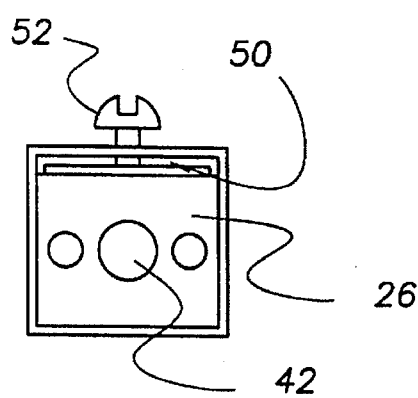
FIG. 5 is an end view of the connection between the second end of the flexible support structure and the sensor housing. The first and second conductors are removed to more clearly show the conductor passageway.

With reference to FIG. 3, flexible support structure 26 is connected between male/female adaptor assembly 18 sensor housing 32. Flexible support structure 26 is twistable into a variety of configurations to allow sensing aperture 36 to be aimed at a desired sensing area by the user. With reference to FIG. 4, once twisted into the desired position, flexible support structure 26 is held in place by a pair of stiffening structures 38 that run the entire length of flexible support structure 26. In this embodiment heavy gauge wire is utilized as the stiffening structures, however, any bendable material that will hold a desired shape against a force at least equal to the weight of sensor housing 24 is sufficient to practice the invention. Both stiffening structures 38 are encased in a resilient plastic core member 40 having a conductor pathway 42 running the entire length thereof. First and second electrical conductors 44, 46 are disposed through conductor pathway 42. With reference once again to FIG. 1A, first electrical conductor 44 is wired between first electrical contact 29 and power input terminal 23. Second electrical conductor 46 is wired between power output terminal 25 and fifth electrical contact 33. Returning to FIG. 4, the connection between sensor housing 32 and flexible support structure 26 is accomplished through a connection aperture 50. FIG. 5 shows an end of flexible support structure 26 disposed within connection aperture 50 and secured in place with a securing screw 52. In this figure, first and second electrical conductors 44, 46 have been removed to more clearly illustrate conductor pathway 42.

Installation and use of light switch 10 is now described with general reference to FIGS. 1–5. Light switch 10 is installed by screwing plug portion 28 into any available light bulb socket and screwing a light bulb 14 into female socket portion 30. Sensor housing 32 is then manipulated into a position wherein the sensing aperture 36 is directed toward the desired sensing area and the conventional light switch controlling the conventional light bulb socket is placed in the ON position. When motion activated switching of light bulb 14 is desired, ON/OFF control switch 37 is placed in the ON position. Light bulb 14 will then receive power until motion sensing circuit 20 does not detect motion for a predetermined period of time. When conventional operation of light bulb 14 is desired, ON/OFF control switch 37 is placed in the OFF position. This allows normally closed power relay 21 to close and light bulb 14 to be operated directly from the conventional light switch.

It can be seen from the preceding description that a multi-positionable motion activated light switch has been provided that is installable into an existing light bulb socket; that has a motion sensing mechanism within the light switch that is easily aimed in a desired direction; and that includes a positioning structure supporting a motion sensing mechanism that is of a length sufficient to allow the motion sensing mechanism to be positioned in a variety of locations adjacent the existing light bulb socket.

It is noted that the embodiment of the multi-positionable motion activated light switch described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A multi-positionable motion activated light switch comprising:
    a male/female adaptor assembly including:
        a male plug portion having a first and a second electrical contact, said plug portion being mechanically mateable with an existing light bulb socket having third and fourth electrical contacts in a manner such that said first and second electrical contacts are each brought into and maintained in electrical connection with one of said third and fourth electrical contacts when said plug portion and said existing light bulb socket are mated; and a female socket portion having a fifth and sixth electrical contact, said female socket portion being mechanically mateable with said connecting base of an existing light bulb having seventh and eighth electrical contacts in a manner such that said fifth and sixth electrical contacts are each brought into and maintained in electrical connection with said third and seventh and eighth electrical contacts when said female socket portion and said connecting base of said existing light bulb are mated;

a motion sensor circuit including a motion sensing mechanism, said motion sensing circuit having a control output in controlling connection with a control input of a power switching device having a first power input terminal and a first power output terminal, said motion sensing circuit being housed within a sensor housing having a sensing aperture through which said motion sensing mechanism is exposed to physical phenomenon; and a flexible support structure, connectable between said adaptor assembly and said sensor housing, having a first and a second electrical conductor running along an entire length thereof through at least one conductor passageway formed through a resilient core member thereof, said core member having at least two bendable stiffening members encased therein along a length thereof, said two stiffening members requiring a force greater than a force equal to a weight of said sensor housing to cause said two stiffening members to bend;

the first conductor being in electrical connection between one of said first and second contacts and said first power input terminal of said power switching device, said second conductor being in electrical connection between one of said fifth and sixth contacts and said first power output terminal, a remaining said first and second contact being in electrically conducting connection with a remaining said fifth and sixth contact when an electrical conducting pathway is provided between said power input terminal and said power output terminal of said power switching device.

2. The multi-positionable motion activated light switch of claim 1, wherein:

said male plug portion is externally threaded; and said female socket portion is internally threaded.

3. The multi-positionable motion activated light switch of claim 1, wherein:

said power switching device is a relay.

4. The multi-positionable motion activated light switch of claim 3 wherein:

said relay is normally closed.

5. The multi-positionable motion activated light switch of claim 1 wherein:

one of said first and second electrical contacts is wired directly to one of said fifth and sixth electrical contacts.

6. The multi-positionable motion activated light switch of claim 1 wherein:

said stiffening members are metal.

7. The multi-positionable motion activated light switch of claim 2, wherein:

said power switching device is a relay.

8. The multi-positionable motion activated light switch of claim 7 wherein:

said relay is normally closed.

9. The multi-positionable motion activated light switch of claim 2 wherein:

one of said first and second electrical contacts is wired directly to one of said fifth and sixth electrical contacts.

10. The multi-positionable motion activated light switch of claim 2 wherein:

said stiffening members are metal.

11. The multi-positionable motion activated light switch of claim 7 wherein:

one of said first and second electrical contacts is wired directly to one of said fifth and sixth electrical contacts.

12. The multi-positionable motion activated light switch of claim 7 wherein:

said stiffening members are metal.

13. The multi-positionable motion activated light switch of claim 8 wherein:

one of said first and second electrical contacts is wired directly to one of said fifth and sixth electrical contacts.

14. The multi-positionable motion activated light switch of claim 8 wherein:

said stiffening members are metal.

15. The multi-positionable motion activated light switch of claim 13 wherein:

said stiffening members are metal.

16. The multi-positionable motion activated light switch of claim 3 wherein:

one of said first and second electrical contacts is wired directly to one of said fifth and sixth electrical contacts.

17. The multi-positionable motion activated light switch of claim 3 wherein:

said stiffening members are metal.

18. The multi-positionable motion activated light switch of claim 4 wherein:

one of said first and second electrical contacts is wired directly to one of said fifth and sixth electrical contacts.

19. The multi-positionable motion activated light switch of claim 4 wherein:

said stiffening members are metal.

20. The multi-positionable motion activated light switch of claim 5 wherein:

one of said first and second electrical contacts is wired directly to one of said fifth and sixth electrical contacts.

* * * * *